United States Patent

Kohno et al.

[11] 3,962,183
[45] June 8, 1976

[54] POLYETHYLENE-1,2-DIPHENOXYETHANE-4,4'-DICARBOXYLATE UNIAXIALLY STRETCHED FILMS OF GOOD DIMENSIONAL STABILITY AND ANTI-FIBRILLATION

[75] Inventors: Mitsuo Kohno; Tsuneo Igarashi, both of Moriyama; Minoru Nomura, Yokohama, all of Japan

[73] Assignee: Asahi Kasei Kogyo Kabushiki Kaisha, Osaka, Japan

[22] Filed: Mar. 5, 1974

[21] Appl. No.: 448,238

[52] U.S. Cl. .............................. 260/47 C; 264/289
[51] Int. Cl.² ................... C08G 63/18; C08G 63/70
[58] Field of Search .................. 260/47 C; 264/289

[56] References Cited
UNITED STATES PATENTS

| | | | |
|---|---|---|---|
| 3,574,046 | 4/1971 | Buteux | 161/165 |
| 3,595,736 | 7/1971 | Buteux | 161/165 |
| 3,689,623 | 9/1972 | Kobayashi et al. | 264/210 F |
| 3,700,540 | 10/1972 | Buteux | 161/165 |
| 3,816,368 | 6/1974 | Kobayashi et al. | 260/47 C |

*Primary Examiner*—Lester L. Lee
*Attorney, Agent, or Firm*—Armstrong, Nikaido & Wegner

[57] ABSTRACT

Films having good dimensional stability and practically no tendency of fibrillation and also other superior mechanical properties can be obtained easily and at a high production speed by stretching a layer of a substantially amorphous polymer consisting mainly of polyethylene-1,2-diphenoxyethane-4,4'-dicarboxylate at a temperature in the range from Tg to 100°C (wherein Tg is a glass transition point) in the longitudinal direction to 1.5 to 3 times the original length and further stretching the resulting film at a high temperature of 150°C or higher and a high stretching velocity 40000% per minute or higher in the longitudinal direction to give a total stretching ratio of 3.1 times or more.

3 Claims, 1 Drawing Figure

U.S. Patent  June 8, 1976  3,962,183
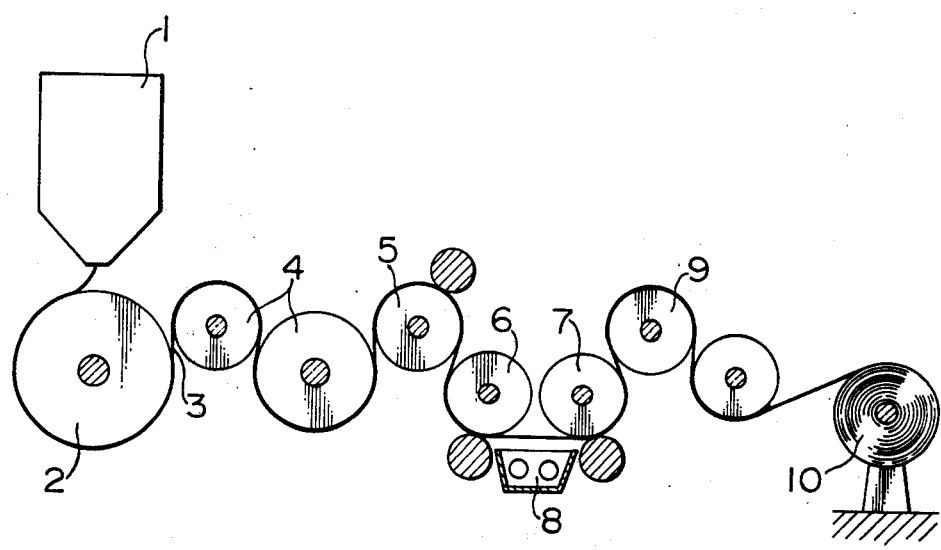

POLYETHYLENE-1,2-DIPHENOXYETHANE-4,4'-DICARBOXYLATE UNIAXIALLY STRETCHED FILMS OF GOOD DIMENSIONAL STABILITY AND ANTI-FIBRILLATION

DESCRIPTION OF THE INVENTION

This invention relates to novel polyester films and a method for producing the same. More particularly it relates to uniaxially stretched polyester films having superior resistance to tearing and cracking and the like, as well as high Young's modulus and high strength and further, good dimensional stability at the time when they are heated.

For polyester films, high strength is, in general, required in the longitudinal direction (i.e. winding direction of film products) due to the demand in their principal application fields and at the same time, stengths against impact or other tearing stresses are also required. Accordingly, in many application fields, such films or tapes as having extremely higher tensile yield strengths in the longitudinal direction, practically sufficient extent of strengths also in the transversal direction, sufficient resistance to the stresses of folding, tearing and impact in all directions, that is, those having no tendency of so-called fibrillation are now in demand in the market. Moreover from the requirements of diversified utilities and advanced grade of required processing, those films have been required which show only a small shrinkage when they are heated i.e. good dimensional stability in addition to the above-mentioned characteristic properties.

Accordingly, it is the first object of the present invention to provide films having the above-mentioned properties.

It is the second object of the present invention to provide a process for producing films having the above-mentioned properties by using a simpler apparatus, with a good production efficiency and an inexpensive cost.

As for films which fulfil the above-mentioned requirements in characteristic properties, biaxially stretched films of polyethylene terephthalate used as a raw material polymer have heretofore been preferably used. In order to stretch film biaxially, however, a transversally (i.e. in TD) stretching apparatus called "tenter" is necessary. This apparatus has drawback not only in its high cost but also in the limitation in production speed. Moreover such troubles as breaking at the time of stretching or the like are apt to occur. Improvements in various individual problems have been made, but, as a whole, this process has had its own fundamental problem.

For the above-mentioned purpose, as disclosed in the specification of U.S. Pat. No. 2,556,295 issued in old time and in that of U.S. Pat. No. 3,627,579 issued recently, processes for producing films having the above-mentioned characteristic properties by only uniaxially stretching polyethylene terephthalate, have been proposed. According to these processes, tapes or films having less tendency of fibrillation have been obtained by putting their point of improvement in, in the case of the former process, division of the uniaxial stretching into two steps, while, in the latter process, use of polymer of high polymerization degree and other factors. However, these processes have had also drawbacks in the following points: Namely, the former put more weight on fibers as seen from the examples thereof but strength in the transversal direction, required for films, is insufficient and heat shrinkage is also poor. The latter cannot satisfy both the properties of heat shrinkage and antifibrillation property completely because these two properties shown mutually opposite directions and further the strength is insufficient in the direction perpendicular to the stretching direction as in the above-mentioned case.

On account of the above-mentioned drawbacks, mainly relative to the quality, it has been difficult for such uniaxially stretched polyethylene terephthalate films to enter the market of biaxially stretched ones and after all only unsatisfactory result has been attained for these films.

In contrast, in the inventions disclosed in the specifications of British Pat. No. 1,136,133 and Japanese patent publication No. 29398/1971, attempt has been made to improve the drawbacks of conventional uniaxially stretched polyethylene terephthalate films by using polyethylene-1,2-diphenoxyethane-4,4'-dicarboxylate instead of polyethylene terephthalate as a raw material polymer, and uniaxially stretching the layer of the polymer.

Of these two patented inventions, the former prevents fibrillation by carrying out heat treatment to increase crystallization degree before longitudinal stretching and the latter prevents fibrillation by dividing longitudinal stretching into two steps and inserting a heat treatment step between these two steps.

However, the processes of these two patented inventions have drawbacks in that if the degree the preliminary crystallization and the temperature of the intermediate heat treatment are lower, sufficient effect cannot be attained in antifibrillation, and if these are elevated to the contrary, uniform stretchability becomes worse, resulting in non-uniform stretching and strength in the transversal direction (T.D.) is lowered by the preliminary crystallization treatment.

After strenuous studies on the process for producing films composed substantially of polyethylene-1,2-diphenoxyethane-4,4'-dicarboxylate, having no drawbacks as mentioned above, by way of uniaxial stretching, in order to attain the above-mentioned objects, we have discovered a uniform and stabilized stretching process which gives films forming no fibrillation and having good dimensional stability by improving the above-mentioned process of Japanese patent publication No. 29398/1971 and arrived at the concept of the present invention. In other words, we have discovered that by omitting the intermediate heat treatment step of the above-mentioned prior art but by carrying out the second step stretching at a temperature far higher than those generally conceivable and at a higher speed beyond those common in the art, the above-mentioned drawbacks are all overcome and films having good dimensional stability and superior mechanical properties, which do not show the tendency of fibrillation, can be obtained and completed the method of the present invention. Since the present invention can be put into practice by using the longitudinal-stretching apparatus consisting of a combination of conventionally used rolls as a means for commercialization, operation is simple and easy and production speed can be readily elevated, and hence it is believed that the present invention provides a method which is very advantageous from the industrial view point.

More detailed description will be given hereinafter with regard to the films of the present invention.

The films of the present invention are uniaxially stretched films consisting essentially of polyethylene-1,2-diphenoxyethane-4,4'-dicarboxylate and having a density of 1.345–1.360, a Young's modulus in the stretching direction of 800–1500 Kg/mm$^2$, a F-5 value (i.e. tensile strength at 5% elongation) in the same direction of 15–40 Kg/mm$^2$, a strength at break in the same direction of 25–70 Kg/mm$^2$, a F-5 value in the direction perpendicular to the stretching direction of 5–10 Kg/mm$^2$, a strength at break in the same direction of 7–15 Kg/mm$^2$, and Elmendorf's tear strength in the stretching direction of 8–20 Kg/mm$^2$ and an elongation at break in the direction perpendicular to the stretching direction of 50–150% and showing a shrinkage of 0–4% in any directions when heated at 150°C. for 2 hours.

Although it is well known that mechanical properties are improved by stretching, occurrences of various phenomena are observed, i.e. as is known in case of polyethylene terephthalate as described above, microcrystallites are developed all together in the stretching direction by heat-setting in case of uniaxial stretching and so-called fibrillation phenomenon occurs due to orientations of molecules along the film surface. As a result, there occur phenomena which reduce mechanical properties greatly, such as easy tearing in the stretching direction, easy splitting by impact, reduction of elongation almost to null in the direction perpendicular to the stretching direction. It is possible to prevent these phenomena by lowering the temperature of heat-setting, but, in such a case, the density of films (crystallization degree of polymer) naturally does not rise and hence molecule-structural strain remains, resulting in films extremely shrinkable on heating. The films of the present invention have not only sufficiently high Young's modulus and strength in the stretching direction but also practically sufficient strength in the direction perpendicular to stretching direction. Further, the films of the present invention are quite satisfactory in both shrinkage and antifibrillation, and although shrinkage and antifibrillation have mutually inconsistent tendencies as mentioned above, substantially no problem occurs in these respects. Particularly it is to be noted that their heat shrinkage is low when they are made so as to have a high strength. For example, at a F-5 value of 30 Kg/cm$^2$, a shrinkage (at 150°C × 2 hours) in the range of 0–3% is observed.

As for standard of judgement for fibrillation, firstly Elmendorf's tear strength in the stretching direction and secondly elongation at break in the direction perpendicular to the stretching direction are to be mentioned, as shown in the above-mentioned U.S. Pat. No. 3,627,579. If these two characteristic values are observed, it is possible to extract problems of films in practical use. If impact strength is checked in addition to these, the standard of judgement for fibrillation will be more sufficient. The practical limiting values in the judgement of fibrillation will be approximately 5 Kg/cm in Elmendorf's tear strength and about 30% in elongation at break in the direction perpendicular to the stretching direction. If both of the above-mentioned two kinds of values are lower than the limiting values, the tendency of fibrillation becomes evident causing practical problem.

From the above-mentioned points, the films of the present invention show properties substantially comparable to conventional biaxially stretched polyethylene terephthalate films and are extremely unique in that they have high Young's modulus and high strength in the stretching direction and yet low heat shrinkage in the same direction as mentioned above. In this respect, they are most suitable to the application field, particularly of magnetic tapes, metallized yarns and the like.

With regard to a method for producing films of the present invention, a detailed explanation will be made hereinafter.

For producing the films of the present invention, a substantially amorphous layer consisting essentially of polyethylene-1,2-diphenoxy-4,4'-dicarboxylate is employed. Here, a third component can be added in the form of copolymerization or blending so long as the kind or amount of the component is in the range which does not harm the properties of the resulting polymer. Further, addition or blending of various additives is optional. For example, a dibasic acid as a third component, such as terephthalic acid, isophthalic acid, phthalic acid, adipic acid, azelaic acid, sebacic acid or the like, and a diol as a third component, such as 1,4-butanediol, propylene glycol, diethylene glycol or the like are copolymerized with the main component of polyethylene-1,2-diphenoxyethane-4,4'-dicarboxylate in an amount of 15 mol % or less (its limit varies slightly depending upon the kind of the third components) based upon the mols of said main component. Or, a polymer such as polyethylene terephthalate is blended to said dicarboxylate. The compositions of the resulting polymers as illustrated above are also included in the scope of the composition of the polymer of the present invention. It does not matter even if various antioxidants, slipping agents, delustering agents, coloring agents, etc. are added to the polymer composition of the present invention, depending upon the utility of film.

As for polymerization degree of polymer, it is preferable to use a polymer of higher polymerization degree for preventing fibrillation. However, in order to hold a balance with the factor having something to do with the polymer cost i.e. productivity of polymer at the time of polymerization, it is advantageous to use a polymer having an intrinsic viscosity [η] of 0.5–1.3, preferably 0.6–1.0, as measured in 0-chlorophenol (1% solution) at 35°C. If it is lower than 0.5, film-forming property is poor and if it is higher than 1.3, polymer cost becomes higher, melt-viscosity of polymer increases, whereby extrusion pressure is elevated and temperature is increased at the time of melt-extrusion, which results in degradation of polymer and breakdown of apparatus.

A polymer having the above-mentioned composition is melted, mixed, measured and extruded from a slot die by using a common extruder and cooled on casting rolls (cooling rolls) to produce a substantially amorphous layer of a suitable thickness. What is important here, is that a polymer should be "substantially amorphous". The temperature Tc (crystallization-initiating temperature at the time when the polymer in molten state is cooled) of the present polymer is about 220°C and the temperature Tcc (crystallization-initiating temperature at the time when the polymer in solid state is heated) is about 74°C. It is a characteristic feature of the polymer of the present invention that Tcc is particularly lower and at the same time, it is a characteristic feature that crystallization speed is faster.

Accordingly, what is important for producing a substantially amorphous layer, is rapid cooling of the layer to 70°C or lower. For that purpose, it is necessary to control the temperature of the casting rolls to a temperature of 60°C. or lower.

The terms "substantially amorphous" herein referred to is defined as follows: although the density of completely amorphous polymer containing no third component is 1.303 g/cm$^3$, the polymer having a density in the range of 1.303–1.310 g/cm$^3$ is defined as a substantially amorphous polymer in the present invention and if a density falls in the above-mentioned range, no problem as hereinafter described in detail, occurs.

As disclosed in the specification of British Pat. No. 1,136,133, the films crystallized from the molten state through cooling step and those obtained by once casting a molten polymer into an amorphous layer and crystallizing the resulting layer by reheating, are apt to bring about unevenness of stretching in the uniaxial stretching step hereinafter described. Further what occur in cases of these films are only break and rearrangement of initially formed microcrystallites and effectiveness of non-fibrillation as in the present invention cannot be brought about. Further, strength in the direction perpendicular to the stretching direction is reduced although the cause is unknown. Accordingly, the forming and using of substantially amorphous layer is an excellent process for overcoming the above-mentioned problems.

The resultant layer is then uniaxially stretched in the longitudinal direction (M.D) but in two steps.

In the first step, stretching is carried out at a temperature as low as possible. More concretely, from the viewpoint of commercially feasible production speed, the temperature should be in the range of Tg (glass transition point, 69°–70°C in case of the present polymer)–100°C, preferably in the range of 70°–90°C. If the first step temperature is lower than this range, stretching becomes non-uniform and if it is higher than this range, the second step stretching becomes non-uniform.

The stretching ratio in the first step can take an optional value in the range of 1.5–3.0 preferably 1.5–2.5. A stretching ratio less than this range makes the effectivenesses of non-fibrillation and high dimensional stability by way of two step stretching less and a stretching ratio greater than this range makes the second step stretching non-uniform and unstable.

Between the first step stretching and the second step stretching, there is no need of inserting any special treatment. It is possible to enter the second step stretching directly from the first step. However, the second step stretching is a most important part of the process for producing the film of the present invention. The second step stretching is carried out at an extremely high temperature of 150° or higher, preferably 180°C or higher, and lower than the melting point, at a high stretching speed of 40000% per minute or higher, preferably 60000% per minute or higher and in a total stretching ratio of the first and the second, of 3.1 times or higher, preferably 3.5 times to 5.0 times. If the stretching temperature is less than the above-mentioned range, it is impossible to satisfy both non-fibrillation and high dimensional stability which are the objects of the present invention, and only a film having an insufficient density can be obtained. If the stretching speed is less than the above-mentioned range, sufficient antifibrillation effect cannot be obtained and at the same time, the strength in the direction perpendicular to the stretching direction does not rise. If the total stretching ratio is not 3.1 times or higher, thickness does not become uniform to a sufficient extent for practical use, and strength in the direction perpendicular to the stretching direction will not be sufficient. In addition, density does not increase sufficiently and high dimensional stability is not satisfied. On the other hand, the use of a stretching ratio greater than 5.0 times is difficult because break of film increases.

Films thus stretched can be further subjected to heat-treatment for heat set to increase their crystallization degree. However, films produced under the ranges of the conditions of the method of the present invention, show a practically satisfactory dimensional stability by stretching alone and hence further heat-treatment is not always necessary.

Particularly when a high temperature of 180°C or higher and lower than the melting point and a total stretching ratio of 4 to 5 times the original length are employed in the second step stretching, uniaxially stretched films having a Young's modulus of 1200–1500 Kg/mm$^2$ in the stretching direction, a F-5 value of 25–40 Kg/mm$^2$ in the same direction, a strength at break of 30–70 Kg/mm$^2$ in the same direction and a shrinkage of 0–2.5% in any directions at the time when heated at 150°C for 2 hours can be obtained without any further heat-treatment.

Such a point that heat-treatment is not always unnecessary is also one of the superior feature of the method of the present invention. However, the heat treatment has its meaning in that crystallization degree is further increased and a higher grade of dimensional stability can be attained without giving no practically harmful influence upon antifibrillation.

As described above, the above-mentioned method of the present invention brings about the superior films of the present invention. Now, the mechanism during the steps of the method will be compared with those of prior application (Japanese patent publication of 29398/1971) and one conventional art (British Pat. No. 1,136,133).

The first feature of the present invention lies in that an amorphous unstretched film is stretched at a lower temperature and successively subjected to a high temperature and high speed stretching to complete a stretched film. It is presumed that microcrystallites formed through the molecular orientation in the first step stretching grow by themselves by the high temperature, high speed stretching of the second step stretching and at the same time the formation of microcyrstallites is enhanced by the molecular orientation and high temperature in the second step stretching and both kinds interfere with each other, resulting in a mutually stabilized crystallization state. It is believed that molelcular orientation and crystal arrangement in the stretching direction and simultaneous formation of random crystals mutually connecting the both prevent fibrillation. This effect is not sufficient in the above-mentioned prior art of preliminary crystallization treatment and the prior application of intermediate heat-treatment. It is presumed that the formation of random crystals for completely preventing fibrillation is not observed, and the rearrangement thereof in the stretching direction occurs by heat treatment to bring about fibrillation phenomenon or only break and rearrangement of crystals formed before stretching (including the intermediate heat treatment) occurs.

On the other hand, investigation was also made with regard to a method in which a uniaxially stretched film having no tendency of fibrillation is produced directly by a high temperature, high speed one step stretching, but according to this method, crystal formation becomes uniform and tendency of fibrillation cannot be avoided.

Next, an apparatus for carrying out the above-mentioned stretching process will be explained.

As for longitudinally stretching machines, those which perform stretching between sets consisting of heating rolls or between heating roll(s) and cooling roll(s) commonly used, and having different speeds are preferable, and three sets of rolls each having different speeds are particularly useful in the present invention. Further, since the second step stretching needs higher temperature and higher speed, it is preferable to employ simultaneously irradiation by means of a far infrared heater as a means for preventing film from sticking onto the rolls and making the stretching point sharper. In this case, it is necessary to control film temperature by measuring the film temperature at a stretching point with a commercially available infrared thermometer or the like. It is also preferable to arrange a combination of heating rolls for carrying out heat treatment therewith, successively to the longitudinally stretching machines. An example of such longitudinally stretching machines will be illustrated referring to the accompanying drawing. In the drawing, numeral 1 shows an extrusion die (slot die); 2 is a casting drum whose temperature is controlled by recirculating warm water inside the drum; 3 is a film not-yet stretched; 4 are a series of preheating rolls whose temperatures are controllable by passing water, steam, oil or the like through the inside thereof; 5 is preheating rolls on which a film is pressed and fixed by nip rolls to carry out stretching between these rolls and numeral 6 (medium speed-driven rolls); the above-mentioned rolls 4–5 are driven at a lower speed; 6 is medium speed-driven rolls as mentioned above, whose speed and temperature are controllable and in which nip rolls are also provided; 7 corresponds to take-up rolls in the second step stretching where speed control at higher speed-driving is possible and at the same time a function as cooling rolls is performed; 8 is a far infrared heater which is used as a heat source of high temperature heating, for fixing the stretching point; 9 is a cooling roll; and 10 is a winding-up machine.

The film and its preparation method of the present invention will be further illustrated by the following Examples without limiting the scope of claim of the present invention.

EXAMPLES 1–24

Polyethylene-1,2-diphenoxyethane-4,4'-dicarboxylate having an intrinsic viscosity [$\eta$] at 0.72 as measured according to the above-mentioned method, after dried in a usual manner, was extruded from a T-die by means of an extruder, at a melting temperature of 280°C, into a sheet, and contacted the surface of a casting drum whose temperature was adjusted to 50°C to give a substantially amorphus unstretched film (density: 1.304 g/cm$^3$) having a thickness of 100$\mu$. The intrinsic viscosity [$\eta$] of the resulting film was 0.70. The unevenness of thickness of the unstretched original film (R%) was 2.6%. This film was uniaxially stretched using a longitudinally stretching machine shown in the drawing, under various conditions shown in Table 1. The results are shown in Table 2. Further, various conditions are described referring to the drawing:

The temperature of preheating rolls 4 was 65°C; that of preheating rolls 5 as the first stretching temperature was variable; that of medium speed-driven rolls 6 was 75°C; and those of take-up rolls 7 and cooling rolls 9 were adjusted to 40°C.

As for the stretching ratios, the first step stretching ratio was established by the speed ratio of rolls 5 to rolls 6, while the second step stretching ratio was established by the speed ratio of rolls 6 to rolls 7, and the second step stretching speed was calculated based upon the following equation:

$$S = (X-1)/d \cdot \frac{V+XV}{2} \times 100$$

wherein
S: Stretching speed (%/min)
X: Second step stretching ratio
d: Stretching zone (length of path line of film between rolls 6 and 7) (m)
V: Speed of rolls 6 (m/min)

Namely, in these Examples, V was varied for varying stretching speed.

Further, in the second step stretching, a far infrared heater was used for fixing the stretching point, and the stretching temperature was adjusted so as to give a fixed value, by controlling the electric power supplied to the heater. For the measurement of the stretching temperature of film, a commercially available optical temperature-sensitive body (a temperature-detector by means of infrared ray) was used.

In addition, the evaluation methods of film shown in Table 2 are as follows:

1. Unevenness of Thickness in TD:

This is an item used for evaluating the uniformity of stretching. The unevenness was shown by $$\frac{\text{Maximum thickness} - \text{Minimum thickness}}{\text{Average thickness}} \times 100\%.$$

In the measurement, the thickness was measured through the chart of a contact type continuous thickness meter manufactured by Tokyo Seimitsu Co., Japan.

2. Young's Modulus in the Stretching Direction, F-5 Value, Tensile Strength at Break and Tensile Elongation at Break were observed according to the measurement method of JIS-C-2318 (JIS: Japanese Industrial Standards.

3. Tear Strength in the Stretching Direction (Elmendorf's). were observed according to JIS-P-8116 (ASTM-D-689).

4. Density was observed in a density-gradient tube containing a mixed solvent of n-heptane/carbon tetrachloride at 25°C.

5. Shrinkage was determined by measuring dimensions of film before and after exposure in an air oven at 150°C for 2 hours. The values in the parenthese are data after heat-treatment carried out at 210°C for 30 seconds (under tension).

Table 1

| Conditions No. | First step stretching | | Second step stretching | | |
|---|---|---|---|---|---|
| | Temp. (°C) | Stretching ratio | Temp. (°C) | Total stretching ratio | Stretching speed (%/min) |
| 1 | 65 | 2.0 | 200 | 3.2 | 60×10$^3$ |
| 2 | 70 | 2.0 | 200 | 3.2 | 60 |
| 3 | 85 | 2.0 | 200 | 3.2 | 60 |
| 4 | 105 | 2.0 | 200 | 3.2 | 60 |
| 5 | 75 | 1.2 | 200 | 3.2 | 60 |

Table 1-continued

| Conditions No. | First step stretching Temp. (°C) | First step stretching Stretching ratio | Second step stretching Temp. (°C) | Second step stretching Total stretching ratio | Second step stretching Stretching speed (%/min) |
| --- | --- | --- | --- | --- | --- |
| 6 | 75 | 1.8 | 200 | 3.2 | 60 |
| 7 | 75 | 2.7 | 200 | 3.5 | 50 |
| 8 | 75 | 3.1 | 200 | 4.0 | 50 |
| 9 | 75 | 2.0 | 130 | 3.2 | 60 |
| 10 | 75 | 2.0 | 150 | 3.2 | 60 |
| 11 | 75 | 2.0 | 170 | 3.2 | 60 |
| 12 | 75 | 2.0 | 210 | 3.2 | 60 |
| 13 | 75 | 2.0 | 230 | 3.2 | 60 |
| 14 | 75 | 2.0 | 200 | 3.0 | 50 |
| 15 | 75 | 2.0 | 200 | 4.0 | 80 |
| 16 | 75 | 2.0 | 200 | 4.8 | 100 |
| 17 | 75 | 2.0 | 200 | 5.2 | 120 |
| 18 | 75 | 2.0 | 200 | 3.5 | 30 |
| 19 | 75 | 2.0 | 200 | 3.5 | 40 |
| 20 | 75 | 2.0 | 200 | 3.5 | 80 |
| 21 | 75 | 1.8 | 200 | 4.0 | 110 |
| 22 | 75 | 1.6 | 200 | 4.5 | 150 |
| 23 | 75 | 2.0 | 210 | 4.5 | 60 |
| 24 | 80 | 2.2 | 220 | 4.5 | 50 |

Table 2

| No. | Thickness unevenness in TD R: % * | Young's modulus in MD (Kg/mm²) | F-5 Value (Kg/mm²) MD | F-5 Value (Kg/mm²) TD | Tensile strength (Kg/mm²) MD | Tensile strength (Kg/mm²) TD | Tensile elongation (%) MD | Tensile elongation (%) TD | Tear strength (Kg/cm) | Density (g/cm³) | Shrinkage at 150°C × 2 hrs. (%) MD | Shrinkage at 150°C × 2 hrs. (%) TD |
| --- | --- | --- | --- | --- | --- | --- | --- | --- | --- | --- | --- | --- |
| 1 | 7.5 | 880 | 18.5 | 5.2 | 22 | 9.1 | 35 | 85 | 10 | 1.351 | 1.2 | 2.0 |
| 2 | 3.0 | 900 | 18.9 | 6.1 | 25 | 10.2 | 30 | 92 | 11 | 1.353 | 0.8 | 1.1 |
| 3 | 2.8 | 910 | 18.9 | 6.3 | 25 | 11.0 | 32 | 88 | 12 | 1.353 | 0.6 | 0.9 |
| 4 | 9.5 | 880 | 18.2 | 4.9 | 24 | 7.8 | 30 | 40 | 8 | 1.354 | 0.6 | 0.5 |
| 5 | 3.3 | 900 | 18.8 | 5.6 | 23 | 8.8 | 28 | 21 | 5 | 1.350 | 1.3 | 2.4 |
| 6 | 3.0 | 910 | 18.5 | 5.7 | 25 | 9.2 | 30 | 101 | 13 | 1.350 | 1.0 | 2.0 |
| 7 | 4.2 | 1050 | 22.3 | 5.5 | 29 | 8.5 | 30 | 58 | 9 | 1.351 | 0.9 | 1.5 |
| 8 | 4.0 | 1250 | 25.2 | 5.0 | 33 | 8.0 | 20 | 33 | 6 | 1.351 | 1.2 | 0.9 |
| 9 | 3.2 (3.2) | 890 (950) | 18.8 (20.1) | 5.8 (7.2) | 23 (27) | 8.2 (8.8) | 25 (35) | 265 (28) | 18 (4) | 1.342 (1.352) | 11.5 (1.2) | 8.5 (0.9) |
| 10 | 3.0 (3.0) | 890 (970) | 18.5 (20.3) | 5.9 (7.7) | 25 (29) | 9.1 (12.0) | 31 (37) | 135 (61) | 15 (9) | 1.348 (1.353) | 3.3 (0.8) | 2.9 (0.3) |
| 11 | 2.9 | 900 | 18.8 | 6.0 | 25 | 9.8 | 32 | 99 | 14 | 1.350 | 2.0 | 1.1 |
| 12 | 2.9 | 910 | 19.1 | 6.0 | 26 | 10.0 | 33 | 90 | 12 | 1.353 | 0.9 | 0.7 |
| 13 | 3.3 | 900 | 18.7 | 5.8 | 25 | 9.5 | 32 | 85 | 12 | 1.352 | 0.9 | 0.8 |
| 14 | 5.5 | 780 | 16.8 | 5.9 | 20 | 9.2 | 39 | 82 | 12 | 1.349 | 3.8 | 4.1 |
| 15 | 3.2 | 1230 | 25.8 | 5.5 | 35 | 9.5 | 28 | 85 | 11 | 1.351 | 1.2 | 1.2 |
| 16 | 3.0 | 1520 | 34.3 | 5.3 | 45 | 8.8 | 25 | 77 | 10 | 1.352 | 1.0 | 0.9 |
| 17 | films were broken so often | | | | | | data could not be obtained | | | | | |
| 18 | 2.9 | 1090 | 22.3 | 5.7 | 31 | 8.9 | 31 | 30 | 5 | 1.350 | 1.4 | 1.8 |
| 19 | 3.1 | 1075 | 21.8 | 5.8 | 30 | 9.1 | 23 | 69 | 85 | 1.351 | 1.2 | 0.8 |
| 20 | 3.2 | 1120 | 22.5 | 5.9 | 35 | 10.2 | 39 | 102 | 11 | 1.351 | 1.1 | 1.0 |
| 21 | 3.0 | 1210 | 25.8 | 5.7 | 38 | 9.8 | 24 | 78 | 10 | 1.350 | 1.8 | 1.5 |
| 22 | 3.3 | 1400 | 29.2 | 5.5 | 40 | 9.2 | 22 | 90 | 10 | 1.350 | 2.1 | 1.4 |
| 23 | 3.1 | 1450 | 30.1 | 5.5 | 43 | 8.9 | 28 | 72 | 9 | 1.351 | 2.0 | 1.3 |
| 24 | 2.9 | 1480 | 31.0 | 5.4 | 42 | 8.8 | 27 | 80 | 9 | 1.353 | 1.4 | 0.8 |

| No. | Notes |
| --- | --- |
| 1 | First step stretching, low temperature → uneven |
| 2 | |
| 3 | |
| 4 | First step stretching, high temperature → uneven |
| 5 | First step, low ratio → fibrillated |
| 6 | |
| 7 | |
| 8 | First step, high ratio → fibrillated |
| 9 | Second step, low temperature → large heat-shrinkage (fibrillated by heat-treatment) |
| 10 | |
| 11 | |
| 12 | |
| 13 | |
| 14 | Second step, low stretching ratio → low strength in stretching direction |
| 15 | |
| 16 | |
| 17 | Second step, high stretching ratio → film breakage, very often |
| 18 | Second step, low speed → fibrillated |
| 19 | |
| 20 | |
| 21 | |
| 22 | |
| 23 | |
| 24 | |

COMPARATIVE EXAMPLE 1

The same unstretched film as in Example 1 was heat-treated under various conditions of (a) at 130°C for 30 seconds, (b) at 180°C for 30 seconds and (c) at 210°C for 30 seconds, and then stretched by a longitudinally stretching machine, where the respective films were stretched only in one step at 210°C and a speed of 70000%/min to 3.2 times the original length. The properties of the resulting films were as follows:

|  | (a) | (b) | (c) |
|---|---|---|---|
| Unevenness of thickness (%) : | 7.9 | 10.5 | 12.5 |
| F-5 value MD (Kg/mm²) TD : | 18.3 | 18.3 | 18.2 |
|  | 4.6 | 4.4 | 3.9 |
| Tensile strength MD (Kg/mm²) TD : | 22 | 23 | 23 |
|  | 5.5 | 5.5 | 5.2 |
| Tensile elongation MD (%) TD : | 30 | 30 | 31 |
|  | 28 | 40 | 50 |
| Tear strength MD (Kg/cm) : | 6.5 | 7 | 8 |
| Density (g/cm³) : | 1.350 | 1.351 | 1.353 |
| Shrinkage (%) MD at 150°C × 2 hrs. : | 1.4 | 1.2 | 1.0 |
| TD : | 1.2 | 0.9 | 1.0 |

It can be seen from these results that according to the prior art (British Pat. No. 1,136,133), stretching is liable to be non-uniform and also strength in the transversal direction is insufficient.

COMPARATIVE EXAMPLE 2

The same unstretched original film as above was stretched only in one step, in the longitudinal direction at a temperature of (a) 150°C or (b) 210°C to 3.5 times the original length. The resulting film stretched at 70000%/min., 150°C was heat-treated at 210°C for 30 seconds. The properties of the films thus prepared were as follows:

|  |  | (a) | (b) |
|---|---|---|---|
| Unevenness of thickness (%) | : | 2.9 | 3.0 |
| F-5 value (Kg/mm²) | MD: | 22.3 | 22.5 |
|  | TD: | 5.5 | 5.3 |
| Tensile strength (Kg/mm²) | MD: | 28.2 | 29.2 |
|  | TD: | 7.9 | 8.5 |
| Tensile elongation (%) | TD: | 8 | 15 |
| Tear strength MD (Kg/cm) | : | 3.8 | 4 |
| Density (g/cm) | : | 1.353 | 1.352 |

As can be seen from the above results, the objective film of the present invention which is nonfibrillated, cannot be obtained by stretching only in one step even at a high temperature.

COMPARATIVE EXAMPLE 3

The same unstretched original film as above was stretched at a stretching temperature of 100°C to a stretching ratio of 1.5 times the original length, in the first stretching, and thereafter heat-treated at 140°C and wound up. Then, the resulting film was again stretched at 180°C so as to give a total stretching ratio of 3.5 times, in the second step stretching. The properties of the film thus prepared were as follows:

| Unevenness of thickness (%) | : | 6.9 | |
|---|---|---|---|
| F-5 value (Kg/mm²) | : | MD 22.8 | TD 4.2 |
| Tensile strength (Kg/mm²) | : | MD 33.0 | TD 6.5 |
| Tensile elongation (%) | : |  | TD 45 |
| Tear strength (Kg/cm) | : |  | MD 7 |
| Density (g/cm³) | : |  | 1.349 |
| Shrinkage (%) at 150°C × 2 hrs. | : | MD 2.0 | TD 1.5 |

As can be seen from these results, the film of the prior application has a problem in the points of unevenness of thickness (uniformity of stretching) and the strength in the transversal direction, and further the film is inferior in anti-fibrillation to that of the present invention.

COMPARATIVE EXAMPLE 4

Polyethylene terephthalate having a $[\eta]$ of 0.85 as measured in $\sigma$-chlorophenol (1% solution) at 35°C was extruded from the same T-die by means of the same extruder as in Example 1, at 280°C, and allowed to fall on a casting roll whose temperature had been adjusted to 50°C, for cooling. The resulting unstretched original film had a thickness of 100μ, a density of 1.338 and a $[\eta]$ of 0.80. The film was stretched in the transversal direction at 95°C and at a customary speed of 30000%/min. To 4.5 times the original length, and then heat-set at 150°C for 3 minutes. The physical properties were as follows:

| Unevenness of thickness (%) | : | RD 3.2% (that TD 3.2% (that unstretched original film: 2.8% | | | |
|---|---|---|---|---|---|
| F-5 value (Kg/mm²) | : | MD | 19.2 | TD | 7.3 |
| Tensile strength (Kg/mm²) | : | MD | 26.2 | TD | 7.5 |
| Tensile elongation (%) | : | MD | 20 | TD | 50 |
| Tear strength (Kg/cm) | : | MD | 5.2 | | |
| Density (g/cm³) | : |  | 1.382 | | |
| Shrinkage (%) at 150°C × 2 hrs. | : | MD | 17.2 | TD | 5.8 |

As seen from the above results, according to the prior art, it has been impossible to give complete anti-fibrillation property together with low heat-shrinkability to polyethylene terephthalate films stretched uniaxially in the transversal direction.

What is claimed is:

1. Uniaxially stretched film consisting essentially of polyethylene 1,2-diphenoxyethane-4,4'-dicarboxylate unit and having a density in the range of 1.345 to 1.360, a Young's modulus of 800–1500 Kg/mm² in the stretching direction, a tensile strength at 5% elongation of 15–40 Kg/mm² in the same direction, a strength at break of 25–70 Kg/cm² in the same direction, a tensile strength at 5% elongation of 5–10 kg/mm² in the direction perpendicular to the stretching direction, a strength at break of 7–15 Kg/mm² in the direction perpendicular to the stretching direction, an Elmendorf's tear strength of 8–20 kG/mm² in the stretching direction, an elongation at break of 50–150% in the direction perpendicular to the stretching direction and a shrinkage of 0–4% in any direction at the time when heated at 150°C for 2 hours.

2. Uniaxially stretched films having good dimensional stability and practically no tendency of fibrillation which are produced by stretching a layer of a substantially amorphous polymer consisting essentially of polyethylene-1,2-diphenoxyethane-4,4'-dicarboxylate unit at a temperature in the range from Tg to 100°C (wherein Tg is a glass transition point) in the longitudinal direction to 1.5 to 3 times the original length in the first step and further stretching the resulting layer in the second step at a high temperature of 150°C or higher and lower than the melting point and a high stretching velocity of 40000% per minute or higher in the same direction to give a total stretching ratio of 3.1 times or more.

3. Uniaxially stretched films consisting essentially of polyethylene-1,2-diphenoxyethane-4,4'-dicarboxylate unit and having a density in the range of 1.345 to 1.360, a Young's modulus of 1200–1500 Kg/mm$^2$ in the stretching direction, a tensile strength at 5% elongation of 25–40 Kg/mm$^2$ in the same direction, a strength at break of 30–70 Kg/cm$^2$ in the same direction, a tensile strength at 5% elongation of 5–10 Kg/mm$^2$ in the direction perpendicular to the stretching direction, a strength at break of 7–15 Kg/mm$^2$ in the direction perpendicular to the stretching direction, an Elmendorf's tear strength of 8–20 Kg/mm$^2$ in the stretching direction, an elongation at brdak of 50–150% in the direction perpendicular to the stretching direction and a shrinkage of 0–2.5% in any direction at the time when heated at 150°C for 2 hours, which films are produced by stretching a layer of a substantially amorphous polymer consisting essentially of polyethylene-1,2-diphenoxyethane-4,4'-dicarboxylate unit at a temperature in the range from Tg to 100°C (wherein Tg is a glass transition point) in the longitudinal direction to 1.5 to 3 times the original length in the first step and further stretching the resulting layer in the second step at a high temperature of 180°C or higher and lower than the melting point and a high stretching velocity of 40000% per minute or higher in the same direction to give a total stretching ratio of 4 to 5 times, and without any heat-treatment.

\* \* \* \* \*